July 8, 1958  A. J. RENFROW  2,841,899
REGISTER FOR SERVICE TRAYS AND THE LIKE
Filed July 5, 1956
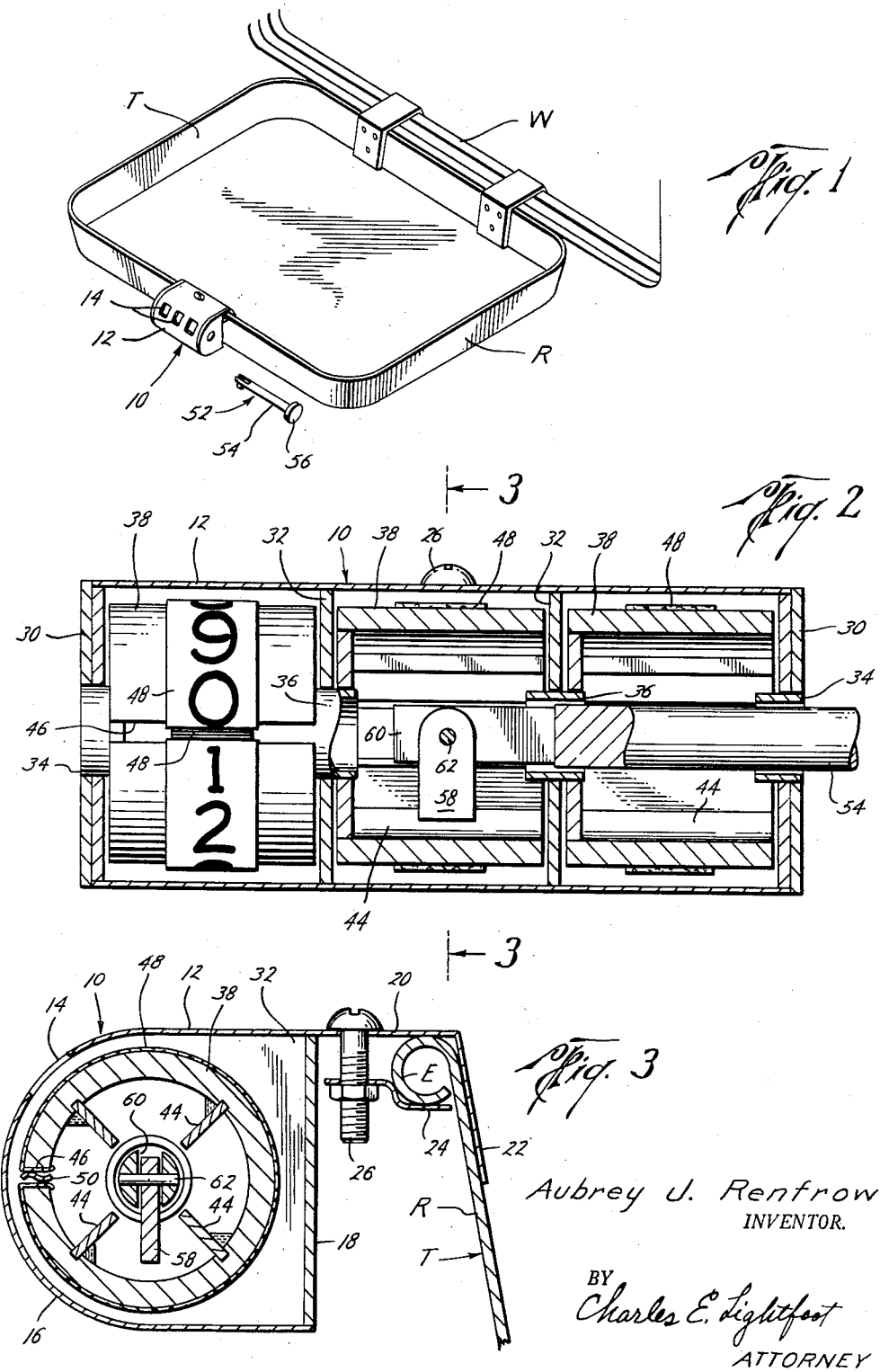
Aubrey J. Renfrow
INVENTOR.
BY Charles E. Lightfoot
ATTORNEY

United States Patent Office 2,841,899
Patented July 8, 1958

2,841,899

REGISTER FOR SERVICE TRAYS AND THE LIKE

Aubrey J. Renfrow, Liberty, Tex.

Application July 5, 1956, Serial No. 596,063

3 Claims. (Cl. 40—68)

This invention relates to a register and more particularly to a device adapted to be attached to a service tray or the like and which may be adjusted to indicate the total amount due in the puchase of the goods which is served.

While not limited to such use the invention finds particular utility in connection with the service of food in restaurants, drive-ins and similar places where food is dispensed and more especially where food is served on trays or similar serving equipment.

In the operation of drive-in restaurants it is customary to serve the food on individual trays, which in many cases are adapted to be supported in the window of an automobile, and, in serving food in this manner, a ticket is usually provided on which the charges of the food is recorded, the ticket being taken up with the tray when the customer is ready to leave and the charges being collected by the waitress at that time. This system of operation often results in the loss of much time and money due to many mistakes being made in adding up the amount to be paid and the loss of tickets when many persons must be served at the same time.

The present invention has for an important object the provision of a register device which is adapted to be attached to a serving tray and by which an individual tally may be kept of the amount to be paid for the food dispensed on each tray.

Another object of the invention is to provide a register whereby the use of checks or tickets becomes unnecessary thus eliminating loss of tickets and reducing the time required for the serving of the food and collecting the charges for the same.

A further object of the invention is the provision of a register and means for operating the same, whereby only the waitress who has the operating device may set the amount registered so that unauthorized changes in the amount to be paid cannot readily be made.

Another object of the invention is to provide a register having means whereby the same may be easily and securely attached to serving trays of different size and design without occupying any of the serving area of the tray and which does not interfere with the use of the tray.

A further object of the invention is the provision of a register for serving trays, which is of simple design and rugged construction and which may be economically manufactured.

The above and other important objects and advantages of the invention may best be understood from the following detailed description, constituting a specification of the same when considered in conjunction with the annexed drawings, wherein—

Figure 1 is a perspective view illustrating a preferred embodiment of the invention and showing the same attached to a serving tray;

Figure 2 is a longitudinal, central, cross-sectional view, on an enlarged scale, showing the construction and arrangement of parts of the invention; and Figure 3 is a cross-sectional view taken along the line 3—3 of Figure 2, looking in the direction indicated by the arrows.

Referring now to the drawings in greater detail the invention is disclosed herein in connection with its use as an attachment for a serving tray of conventional design, such as that indicated at T in Figure 1, of a type adapted to be supported in a window W of an automobile in a well known manner and upon which food may be placed in a convenient location for the customer. It will be understood, however, that the invention is not limited to use on serving trays of the kind illustrated, but is capable of use on trays or other supporting devices of similar character wherever it may be desired to register the amount to be paid or other information relating to the articles displayed on the support.

The register of the invention is generally indicated at 10 and comprises a housing 12, which may be of any convenient shape such as that shown, which is generally cylindrical, and having a number of spaced apart window openings 14 through which the numbers or other indicia indicating the amount to be paid may be viewed. The housing, in the present illustration, is formed of sheet material, such as plastic, metal or the like, having the requisite physical properties for such use, and is formed with a rounded front wall 16, a flat rear wall 18 and a rearwardly extending top wall portion 20 which has a downturned rear end tray engaging portion 22. The top wall portion 20 extends rearwardly beyond the rear wall 18 and beneath this wall portion 20 exteriorly of the rear wall 18 a clamp element 24 is disposed, which is perforated to receive a bolt 26 which also extends through a perforation in the wall portion 20. As best seen in Figure 3 of the drawings, the clamp element 24 may be positioned exteriorly of the usual upturned rim R of the tray T in contact with the customary outwardly rolled upper edge portion E thereof, while the wall portion 20 extends over the edge portion E in contact with the same and the downturned portion 22 lies in contact with the inner face of the rim R. By tightening the nut 28 on the bolt 26, with the parts in the position shown, the edge E may be securely clamped between the wall portion 20 and the clamp element 24 to hold the register attached to the tray in position for easy access without occupying any of the serving area of the tray or in any way interfering with the use of the same.

The housing 10 has end walls 30, one or both of which may be centrally perforated, and also has interior transverse walls 32 which are similarly perforated, each of the perforations of the end walls having a bushing 34 therein; which extends inwardly into the housing, while the perforations of the interior walls 32 are provided with similar bushings 36 extending therethrough.

Within the housing hollow, indicia carrying drums 38 are rotatably supported on the bushings 34 and 36 between the interior walls 32 and between these walls and the end walls 30, each of the drums having an end wall 40 provided with a central opening 42 through which one of the bushings is extended and also having interior, peripherally spaced, radially extending vanes 44 which terminate in spaced relation to the longitudinal axis of the drum. The drums 38 may be of a size to closely fit the interior of the drums so that frictional contact between the drums and the interior walls 32 and the end walls 34 will present free rotation of the drums, or suitable friction means, not shown, may be provided between the walls 34 and 36 and the drums to hold the drums against free rotation in the housing.

Each of the drums 38 is formed with a longitudinal slot, as shown at 46, and an indicia bearing strip 48 encircles the drum and has its ends extending into the slot. A wedge element or retainer member 50 is also inserted in the slot 46 in engagement with the end portions of the strip 48 to hold the strip tightly engaged about the exterior of the drum. The strip 48 may have numbers imprinted thereon, for example from 1 to 0, whereby any amount from one cent to nine dollars and ninety-nine cents may be registered by rotating the drums to bring the desired sum into view through the openings or windows 14.

For the purpose of rotating the drums 38 an elongated key element 52 is provided which takes the form of a shaft 54 of a size to be slidably extended through the bushings 34 and 36 and the drums and having a knob 56 at one end. A latch element 58 is pivotally connected to the other end of the shaft 54 within an end slot 60 therein, as by means of a pivot pin 62, which latch element is shaped to fall by gravity to a position, illustrated in Figures 2 and 3 with its lower end extending between adjacent ones of the vanes 44, of one of the drums 38, when the key is inserted in the housing, so that the drum may be rotated by rotating the knob 56. By inserting the key in the housing until the latch 58 is in any selected one of the drums the latch will fall to the position illustrated and will engage one of the vanes 44 in the drum to turn the drum upon rotation of the key, whereby the desired number may be moved into registration with the window 14. Because of the pivoted connection of the latch 58 with the key it will be apparent that the key may readily be inserted into and removed from the housing, the latch moving into the slot 60 to permit such insertion and removal and being of a width to freely pass through the drums and bushings. As soon as the key is turned with the latch in one of the drums, however, the latch falls to a position to engage the vanes 44 to rotate the drum upon rotation of the key. By this means the drums may only be rotated by the use of the key thus preventing unauthorized operation of the register.

With the register of the invention attached to a tray in the manner disclosed, the waitress may operate the register to indicate the amount to be paid for the food served on the tray, and in case additional items are ordered the register may be operated by the key which is only in the possession of the waitress, whereby an accurate register is kept of the amount to be paid.

It will thus be seen that the invention constructed and used in the manner described above provides a register for serving trays which is relatively tamper proof, and by the use of which it becomes unnecessary to write out a ticket or check in connection with each order, thus substantially reducing the labor and expense involved and the likelihood of mistakes in the sum to be collected.

The invention is disclosed herein in connection with a certain specific embodiment of the same, but it will be understood that this is intended by way of illustration only and that various changes can be made in the construction and arrangement of the parts without departing from the spirit of the invention or the scope of the appended claims.

Having thus clearly shown and described the invention, what is claimed as new and desired to secure by Letters Patent is:

1. A register comprising a housing of generally cylindrical shape open at its opposite ends and having aligned window openings, cylindrical indicia bearing elements rotatably mounted in the housing, each of said elements having indicia thereon positioned to be moved into and out of registration with one of said openings upon rotation of the element, and means insertable in an end of the housing and having a portion positioned to be selectively engaged with each of said elements to rotate the elements.

2. A register comprising a housing having a cylindrically curved front wall portion provided with aligned window openings and end walls and longitudinally spaced transverse interior walls each provided with a central opening, cylindrical bushings in said central openings extending inwardly of said end walls and on each side of said interior walls, cylindrical indicia bearing elements in the housing and having end walls provided with central openings through which said bushings are extended to rotatably support the elements in the housing, peripherally spaced, radially inwardly extending vanes in said elements whose inner edges terminate in radially outwardly spaced relation to said bushings, each of said elements also having a longitudinal slot therethrough, indicia bearing strips of flexible material extending peripherally about the exterior of each of said elements and having end portions extending into said slot, means in said slots shaped to engage said end portions to clamp said strips to the elements, said strips having indicia thereon positioned to be moved into and out of registration with said window openings upon rotation of said elements, an elongated operating member shaped to be inserted into the housing through said bushings for rotation therein, and means on said member positioned to be extended between adjacent ones of the vanes of each of said elements to rotate the element with said member.

3. A register comprising a housing of generally cylindrical shape open at its opposite ends and having aligned window openings, cylindrical indicia bearing elements rotatably mounted in the housing for rotation about a common axis extending longitudinally of the housing, radially inwardly extending vanes in said elements whose inner ends terminate in radially outwardly spaced relation to said axis, each of said elements having indicia thereon positioned to be moved into and out of registration with one of said openings upon rotation of the element, an operating member insertable in an end of the housing and a latch pivotally carried on said member for movement under the influence of gravity to a position extending between adjacent vanes of each of said elements whereby upon rotation of the member with said latch so engaged in the element the element will rotate.

References Cited in the file of this patent

UNITED STATES PATENTS

| | | |
|---|---|---|
| 679,462 | Kennedy et al. | July 10, 1901 |
| 2,585,420 | Ailes | Feb. 12, 1952 |